US005969298A

United States Patent [19]
Dodd

[11] Patent Number: 5,969,298
[45] Date of Patent: Oct. 19, 1999

[54] COMPRESSION DRIVER

[75] Inventor: Mark Dodd, Woodbridge, United Kingdom

[73] Assignee: KH Technology Corporation, Cayman Islands, Virgin Islands (Br.)

[21] Appl. No.: 09/028,836

[22] Filed: Feb. 24, 1998

[30] Foreign Application Priority Data

Feb. 25, 1997 [GB] United Kingdom .................. 9703867

[51] Int. Cl.[6] .................................................. G01K 13/00
[52] U.S. Cl. .......................................... 181/171; 381/433
[58] Field of Search .................................. 181/141, 150, 181/171, 173, 175; 381/189, 191, 396, 398, 430, 433

[56] References Cited

U.S. PATENT DOCUMENTS 4,546,850 10/1985 Litner ..................................... 181/141
5,150,419 9/1992 Kizak et al. ........................... 381/430
5,566,242 10/1996 Hall ........................................ 181/150

*Primary Examiner*—Khanh Dang
*Attorney, Agent, or Firm*—Kenneth L. Sherman, Esq.; Sherman & Sherman

[57] ABSTRACT

A loudspeaker clamping structure embodying an improved compression driver is provided. The clamping structure is configured to utilize a totality of the air contained within a cover coupled to a magnet structure of a loudspeaker. The clamping structure includes a compression driver that extends about the periphery of a membrane for clamping the membrane to the magnet structure. The cover includes an annular ring configured to engage the compression driver. At least one of the ring and compression driver is configured with a plurality of interstices along its length to provide interstitial gaps when the ring and compression driver are engaged. The interstitial gaps allow a volume of air within a central cavity to communicate with a second volume of air located in a peripheral cavity, to increase the quantity of available air that the membrane radiates into, so that the dimensions of the cover can be reduced without diminishing the quality of sound, and particularly the low frequency response, produced by the loudspeaker.

11 Claims, 2 Drawing Sheets

COMPRESSION DRIVER

CROSS-REFERENCES TO RELATED APPLICATIONS

This application claims the benefit of U.K. Patent Application No. 9703867.3, filed Feb. 25, 1997.

BACKGROUND OF THE INVENTION

1. Field of the Invention

The present invention relates generally to membrane clamping arrangements for use in loudspeakers, and more particularly, to a loudspeaker membrane clamping structure that allows the usage of a totality of the volume of available air contained within the loudspeaker to reduce the dimensions of the loudspeaker.

2. Description of Related Art

Known loudspeaker compression drivers comprise a membrane that is clamped between a magnet structure and a cover. A mechanical annular clamp is used to hold the membrane in place on the magnet structure without interfering with movement of a convex body portion of the membrane. One economical prior art method of holding the membrane in place on the magnet structure comprises providing an annular ring configured to extend around the membrane. The ring has a continuous upwardly projecting rib that extends along its upper surface. An interior surface of the cover is configured with a downwardly projecting rib that is aligned with the upwardly projecting rib of the ring, when the cover is coupled to the magnet structure. With the cover coupled to the magnet structure, the cover's rib exerts a clamping force on the rib of the ring which presses the ring tightly against the membrane and magnet structure, for securing the membrane against the magnet structure and prevent relative movement therebetween.

However, a disadvantage of this method is that the two ribs are in continuous contact along their abutting surfaces and form an isolated central cavity and a peripheral cavity. The central cavity being defined by the inner periphery of each of the ribs, a portion of the cover's interior surface located within the inner periphery of the cover's rib, and the body of the membrane. The peripheral cavity is defined by the exterior periphery of the ribs, a portion of the cover's interior surface extending between the exterior periphery of the ribs and an outer edge thereof, and a surface of the magnet structure extending between the exterior periphery of the ribs and an outer edge thereof having the cover's outer edge coupled thereto. Since a first volume of air, located within the central cavity, is isolated from a second volume of air, located in the peripheral cavity, the quantity of available air into which the membrane radiates is substantially limited.

An alternative method for securing the membrane to the magnet structure comprises disposing a plurality of fasteners, such as screws, through a back of the magnet structure. The membrane is then positioned on the magnet structure and the fasteners are actuated to engage the membrane, for securing the membrane to the magnet structure. However, a disadvantage of utilizing fasteners for securing the membrane to the magnet structure is that it is somewhat cost intensive.

Further, prior art attempts have been made to reduce the size of the cover. Reducing the size of the cover, which typically comprises die-cast aluminum, would be advantageous for a number of reasons. Most notably, the amount of aluminum that is required to fabricate the cover could be reduced and the overall dimensions of the loudspeaker can also be reduced, resulting in a space savings. Unfortunately, when the size of the cover is reduced, the size of the central cavity, formed when the cover is secured to the magnet structure, into which the membrane radiates is similarly reduced. Reducing the size of the central cavity is substantially disadvantageous, since the volume of available air, the quantity of air contained within the central cavity, is reduced. This reduction of available air results in the increase of air pressures within the central cavity, causing a degradation in the quality of sound produced by the loudspeaker, and particularly degradation of the low frequency response of the loudspeaker.

Thus, there exists a need for a compression driver structure that enables the dimensions of a loudspeaker cover to be reduced without diminishing the quality of sound produced by the loudspeaker, and particularly without diminishing the low frequency response thereof.

OBJECTS OF THE INVENTION

It is therefore an object of the present invention to provide an improved loudspeaker clamping structure;

It is another object of the present invention to provide an improved loudspeaker clamping structure that enables the dimensions of a loudspeaker cover to be reduced without diminishing the quality of sound produced by the loudspeaker, and particularly without diminishing the low frequency response thereof;

It is a further object of the present invention to provide an improved loudspeaker clamping structure that increases the quantity of available air contained within the loudspeaker;

It is still another object of the present invention to provide an improved loudspeaker clamping structure that provides uniform clamping of a membrane to a magnet structure of the loudspeaker;

It is yet a further object of the present invention to provide an improved loudspeaker clamping structure that provides ease of manufacture thereof; and It is another object of the present invention to provide an improved loudspeaker clamping structure that is substantially economical to fabricate.

SUMMARY OF THE INVENTION

These and other objects and advantages of the present invention are achieved by providing an improved loudspeaker clamping structure embodying an improved compression driver. The invented loudspeaker clamping structure is configured to utilize a totality of the air contained within a cover of a loudspeaker and a magnet structure secured to the cover. The invented loudspeaker clamping structure includes an annular compression driver that extends about the periphery of a membrane of the loudspeaker and provides uniform clamping of the membrane to the magnet structure. By utilizing the totality of the air within the loudspeaker assembly the creation of undesirably high air pressures are avoided, while simultaneously improving low frequency response. This enables the dimensions of the loudspeaker's cover to be reduced without diminishing the quality of sound produced by the loudspeaker, and particularly without diminishing the low frequency response thereof.

In the preferred embodiment, the loudspeaker clamping structure of the present invention includes a membrane configured to be coupled to a magnet structure. An annular compression driver, or clamping ring, is configured to extend about the periphery of the membrane, for coupling the membrane to the magnet structure without interfering with the movements of a convex body portion thereof.

The present invention further includes a cover dimensioned to enclose the membrane and clamping ring of the loudspeaker. The cover is provided with a clamping means integrally formed on its interior surface. The clamping means is formed complementary to the clamping ring to provide surface-to-surface contact therebetween, when the cover is coupled to the magnet structure. With the cover coupled to the magnet structure, the clamping means exerts a clamping force on the clamping ring which presses the ring tightly against the membrane and magnet structure, for securing the membrane against the magnet structure to prevent relative movement therebetween.

Additionally, when the cover is coupled to the magnet structure a central cavity and a peripheral cavity are formed, as in the prior art. However, in the present invention at least one, and preferably both, of the clamping means and clamping ring is provided with a plurality of interstices along its length so that a plurality of interstitial gaps are formed along the abutting clamping means and clamping ring. The interstitial gaps allow a first volume of air, located within the central cavity, to communicate with a second volume of air, located in the peripheral cavity. Therefore, the quantity of available air into which the membrane radiates is substantially increased over prior art structures. Since the volume of available air is greatly increased over the prior art, the dimensions of the cover can be substantially reduced, and thus reduce the overall dimensions of the loudspeaker without increasing the air pressures within the loudspeaker.

Preferably, the clamping ring is provided with a series of spatially positioned protuberances that extend along its length. The protuberances are spatially positioned along the clamping ring to form interstices therebetween for providing the interstitial gaps when the ring is in surface-to-surface contact with the clamping means. Additionally, the protuberances are configured to evenly distribute the clamping force about the length and width of the clamping ring to ensure that the clamping force is uniformly applied to the periphery of the membrane for clamping the membrane to the magnet structure.

Further, the clamping means may optionally be provided with a plurality of downwardly projecting teeth. When provided, the teeth are positioned along the clamping means, such that each tooth engages each protuberance to form the interstitial gaps between adjacent pair of engaged teeth and protuberances. This further ensures that the clamping force is uniformly applied to the periphery of the membrane, for clamping the membrane to the magnet structure, while allowing for air flow between the central and peripheral cavities. Preferably, the teeth have a bottom surface configured to engage a top surface of the protuberances. The teeth may have inwardly tapered sides to form generally triangular interstices therebetween to provide the interstitial gaps, when the clamping means is abutting the clamping ring.

The configuration of the protuberances and teeth is selected to provide ease of manufacture thereof. Particularly, the protuberances may have a frusto-conical configuration that provides ease of manufacture thereof, such as when injection molding is used to form the compression driver. Similarly, the tapered sides of the teeth enhances the ease with which the cover may be cast, such as by die casting thereof, from aluminum for example.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, in which:

DESCRIPTION OF THE PREFERRED EMBODIMENTS

The following description is provided to enable any person skilled in the art to make and use the invention and sets forth the best modes presently contemplated by the inventor of carrying out the invention. Various modifications, however, will remain readily apparent to those skilled in the art, since the generic principles of the present invention have been defined herein.

Figure 1:
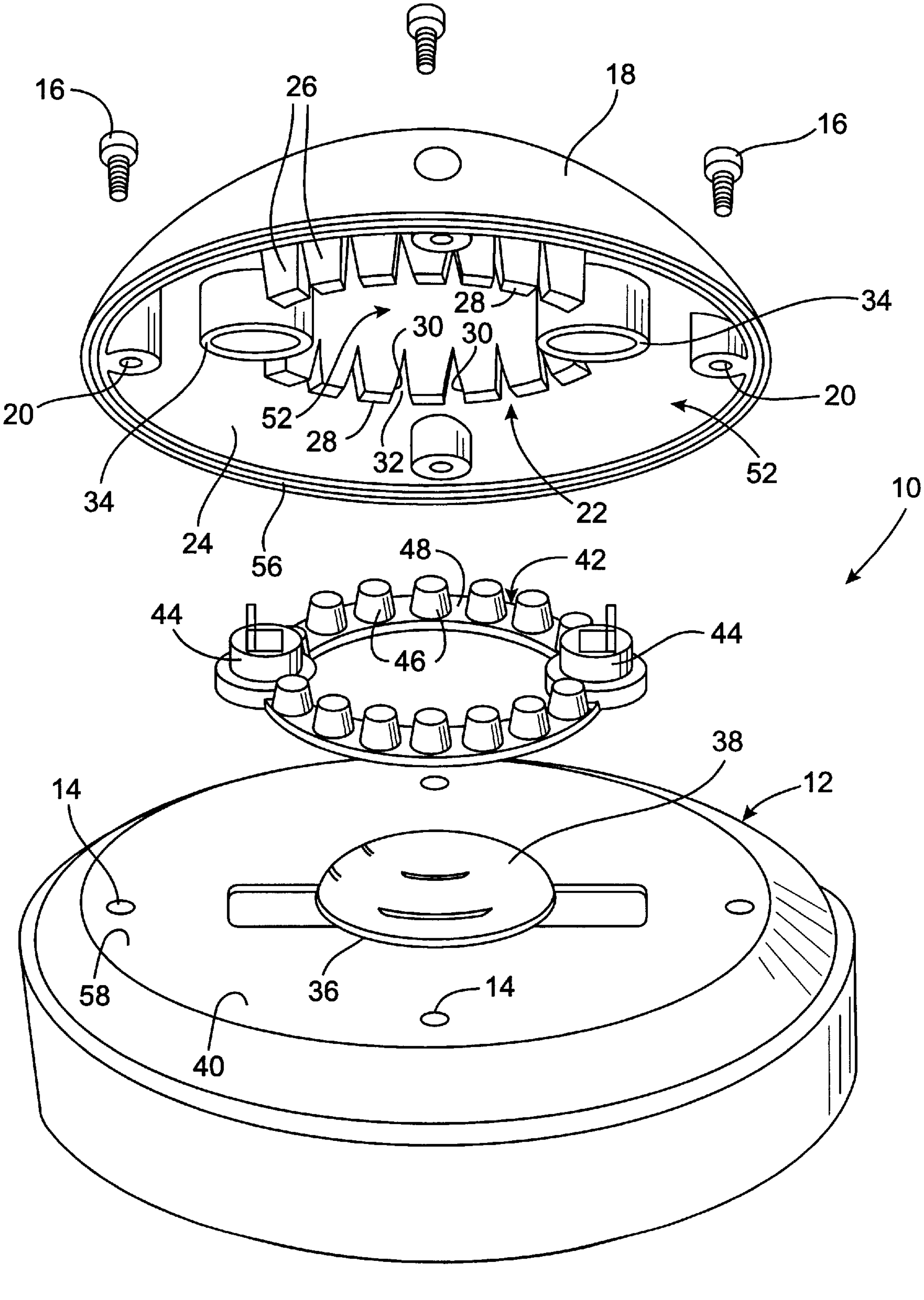
FIG. 1 is an exploded, perspective view showing a preferred embodiment of a loudspeaker clamping structure of the present invention.

Referring now to FIG. 1 of the drawings, their is shown generally at 10, a preferred embodiment of a loudspeaker clamping arrangement for a loudspeaker constructed according to the principles of the present invention. The invented clamping arrangement 10 includes a magnet structure and phase-corrector assembly 12 having a plurality of threaded holes 14 formed therein. The holes 14 are dimensioned to receive screws 16 for securing a cover 18 to the magnet structure 12. The screws 16 extend through apertures 20 formed in the cover 18 and are threaded into the holes 14 to secure the cover 18 to the magnet structure 12.

The cover 18 as shown in FIG. 1 is dome-shaped and preferably comprises a metal alloy, such as Mazak aluminum and zinc alloy, and may be fabricated by die-casting. However, the cover 18 may comprise other suitable shapes and may comprise other known alternative materials and may be fabricated using any method well known in the art. For example, the cover 18 may alternatively comprise a suitable polymeric material and which can be fabricated by injection molding. The advantages provided by the present invention 10, to be discussed thoroughly hereinafter, enable the dome-shaped cover 18 to be somewhat shallow, for reducing the mass of aluminum required to form the dome 18 and for reducing the overall dimensions of the loudspeaker.

Figure 2:
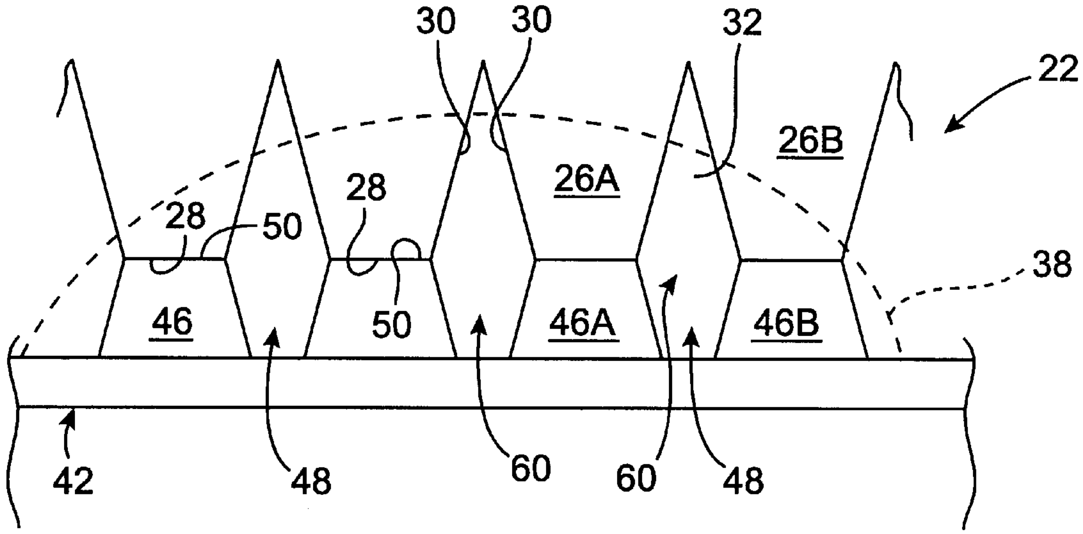
FIG. 2 is a fragmentary, side elevational view showing a compression driver of the preferred embodiment engaged by a clamping means of the present invention and coupled to a magnet structure.

Referring now to FIG. 1 and FIG. 2 of the drawings, an annular clamping means, shown generally at 22, is formed on an interior surface 24 of the dome 18. The clamping means 22 preferably comprises an annular ring of downwardly projecting teeth 26. Each of the teeth 26 has a planar bottom surface 28 and inwardly tapered side edges 30 to form generally triangular interstices 32 between each of the teeth 26. However, the teeth 26 may comprise any suitable alternative configuration, that allows interstices 32 of any suitable shape between adjacent teeth, such as the adjacent teeth 26A, 26B shown in FIG. 2. The clamping means 22 is further provided with a pair of downwardly depending bosses 34.

A membrane 36 having a convex body portion 38, that is associated with a voice coil (not shown), is positioned centrally on a planar outer surface 40 of the magnet structure 12. An improved compression driver, or clamping ring, shown generally at 42, is used to secure the membrane 36 to the magnet structure 12. The clamping ring 42 is dimensioned similarly to the annular clamping means 22 for mating therewith and preferably comprises a known polymeric material, or materials, such as any appropriate plastic material, and is fabricated using methods known in the art, such as injection molding.

Referring still to FIG. 1 and FIG. 2, the clamping ring 42 includes a pair of diametrically opposed upwardly projecting terminals 44. The ring 42 is provided with terminals 44 for connecting to the voice coil. The bosses 34 are configured to seal onto an o-ring (not shown) placed on each of the terminals 44 to prevent the voice coil from disconnecting from the terminals 44.

Spatially positioned along the ring 42 and interposed between the terminals 44 are a plurality of upwardly projecting studs 46. The studs 46 preferably have a frusto-conical configuration to form generally triangular interstices 48 between adjacent pairs 46A, 46B of the studs 46. The frusto-conical configuration of the studs 46 further is provided to uniformly distribute the clamping force about the length and width of the clamping ring 42. Therefore, the load of the clamping force is distributed uniformly about the ring 42, to ensure that the membrane 36 is securely clamped to the magnet structure 12. However, the studs 46 may comprise suitable alternative configurations that uniformly distributes the clamping force about the ring 42 and that allows interstices 48 between adjacent stubs 40, such as the adjacent stubs 46A, 46B shown in FIG. 2. The frusto-conical configuration of the studs 46 also provides ease of manufacture, such as molding. The studs 46 are positioned along the ring 42 at intervals equivalent to the positioning of the teeth 26 along the clamping means 22, so that a planar top surface 50 of each of the studs 46 abuts the planar bottom surface 28 of each of the teeth 26, when the cover 18 is coupled to the magnet structure 12.

With the cover 18 coupled to the magnet structure 12, a central cavity, shown generally at 52, and a peripheral cavity, shown generally at 54, are formed. The central cavity 52 is defined by the inner periphery of the abutting clamping means 22 and clamping ring 42, a portion of the cover's interior surface 24 located within the inner periphery of the clamping means 22, and the body 38 of the membrane 36. The peripheral cavity 54 is defined by the exterior periphery of the abutting clamping means 22 and clamping ring 42, a portion of the cover's interior surface 24 extending between the exterior periphery of the abutting clamping means 22 and clamping ring 42, and an edge 56 thereof, and an outer edge 58 of the planar surface 40 of the magnet structure 12 having the cover 18 coupled thereto.

Thus, a surface-to-surface (top surface 50 of stud 46 abutting bottom surface 28 of tooth 26) engagement is achieved between each tooth 26 and stud 46, to form interstitial gaps 60 between adjacent pairs of teeth 26A, 26B and studs 46A, 46B. For example, as shown in FIG. 2, the top surfaces 50 of a pair of adjacent studs 46A, 46B abut the bottom surfaces 28 of a pair of adjacent teeth 26A, 26B, to form an interstitial gap 60 (best seen in FIG. 2) between the abutting teeth and studs 26A–46A and 26B–46B. The interstitial gap 60 therefore comprises the communicating triangular interstices 32, 42 interposed between the adjacent pairs of teeth 26A, 26B and studs 46A, 46B. When the cover 18 is coupled to the magnet structure 12, the clamping means 22 exerts a clamping force on the compression driver 42, for clamping the membrane 36 to the magnet structure 12 to prevent relative movement therebetween. The surface-to-surface engagement between the teeth 26 and studs 46 ensures that the clamping force is uniformly applied to the periphery of the membrane 36, while allowing air flow between the central and peripheral cavities 52, 54.

The interstitial gaps 60 between adjacent abutting teeth 26 and studs 46 permits full acoustic communication between a first volume of air, located within the central cavity 52, and a second volume of air, located within the peripheral cavity 54, so that the totality of air available in both cavities 52, 54 is utilized by the radiating membrane 36. The compression driver 42 of the present invention 10 therefore provides access to a volume of air, substantially enlarged over the prior art, and uniform clamping about the periphery of the membrane 36, to secure the membrane 36 to the magnet structure 12. Thus, the membrane 36 can radiate into the totality of the air available within the central and peripheral cavities 52, 54, so that the dimensions of the cover 18 may be substantially reduced without diminishing the quality of sound produced by the loudspeaker, and particularly without diminishing the low frequency response thereof. Further, reducing the dimensions of the cover 18 enables the overall dimensions of the loudspeaker to be reduced.

While the teeth 26 and studs 46 disclosed are provided with an overall tapered configuration, comprising the tapered sides 28 of the teeth 26 and the frusto-conical configuration of the studs 46, it is to be understood that the teeth 26 and studs 46 may comprise any suitable alternative configuration that allows for interstitial gaps 60 between adjacent abutting teeth 26 and studs 46 so that communication between the two volumes of air is not sacrificed. The preferred configuration of the teeth 26 and studs 46 is selected to provide ease of manufacture thereof. For example, the frusto-conical configuration of the studs 46 enhances the ease with which the compression driver 42 can be injection molded. Similarly, the tapered sides 28 of the teeth 26 enhances the ease with which the cover may be cast, such as by die casting.

Thus, there has been described an improved loudspeaker clamping structure embodying an improved compression driver of the present invention. The interstitial gaps between adjacent pairs of abutting teeth ensures that the clamping force is applied to the periphery of the membrane, for clamping the membrane to the magnet structure, while allowing for air flow between the central and peripheral cavities. This enables the membrane to radiate into the totality of the air available within the central and peripheral cavities, so that the dimensions of the cover may be substantially reduced without diminishing the quality of sound produced by the loudspeaker, and particularly without diminishing the low frequency response thereof. The frusto-conical configuration of the studs ensures that the clamping force is uniformly distributed about the compression driver so that the membrane is securely clamped to the magnet structure.

Those skilled in the art will appreciate that various adaptations and modifications of the just-described preferred embodiments can be configured without departing from the scope and spirit of the invention. Therefore, it is to be understood that, within the scope of the appended claims, the invention may be practiced other than as specifically described herein.

What is claimed is:

1. A loudspeaker clamping structure comprising:

a magnet means;

a compression driver configured to secure the membrane to the magnet means;

a cover member configured to couple to the magnet means and enclose the membrane and compression driver, the cover member including a clamping means configured to engage the compression driver, at least one of the clamping means and compression driver configured with interstices to provide openings through the compression driver and clamping means while the compression driver and clamping means are engaged to allow air flow therethrough; and said compression driver being configured to extend about the periphery of the membrane for securing the membrane to the magnet means without interfering with movements of a body portion thereof, the compression driver having a plurality of upwardly projecting protuberances extending along its length configured to be engaged by the clamping means, the protuberances positioned along the compression driver, such that interstices are formed therebetween to allow air flow therethrough while the compression driver and clamping means are engaged, so that movements of the membrane are not adversely affected by air pressure to increase the low frequency response of the membrane when the cover member is coupled to the magnet means.

2. The clamping structure of claim 1 wherein the clamping means is provided with a plurality of downwardly extending teeth positioned along its length, each of the teeth configured to engage the compression driver for exerting a clamping force thereon for pressing the compression driver against the membrane to secure the membrane to the magnet means, the teeth configured with interstices therebetween to allow air flow therethrough while the compression driver and clamping means are engaged so that air contained within the cover member, when the cover member is coupled to the magnet means, may move freely about therein so that the dimensions of the cover may be reduced without adversely affecting the movements of the membrane and low frequency response thereof.

3. The clamping structure of claim 2 wherein the protuberances have a generally frusto-conical configuration to distribute the clamping force about a length and a width of the compression driver to secure the membrane to the magnet means.

4. A loudspeaker clamping structure comprising:

a magnet structure;

a membrane configured to couple to the magnet structure, the membrane having a convex body portion;

a compression driver configured to extend about the periphery of the membrane for securing the membrane to the magnet structure, the compression driver having a plurality of spatially positioned studs extending along its length, the studs positioned along the compression driver, such that interstices are formed therebetween; and a cover member configured to couple to the magnet structure and enclose the membrane and compression driver, the cover having a downwardly projecting clamping means formed on an interior surface thereof, the clamping means configured similarly to the compression driver so that when the cover is coupled to the magnet structure, the clamping means engages the compression driver to form a central cavity and a peripheral cavity, the clamping means including a plurality of downwardly extending teeth positioned along its length, such that each tooth engages each stud, when the cover is coupled to the magnet structure, so that the clamping means exerts a clamping force on the compression driver to press the compression driver against the periphery of the membrane and magnet structure, for securing the membrane to the magnet structure, interstices between each of the teeth and studs providing interstitial gaps between adjacent pairs of engaged studs and teeth for allowing air to flow freely therethrough and between the central cavity and peripheral cavity, so that the membrane can radiate into a totality of the air available within the central and peripheral cavities, so that the dimensions of the cover may be substantially reduced without diminishing the quality of sound produced by the membrane, and particularly without diminishing the low frequency response thereof.

5. The clamping structure of claim 4 wherein a bottom surface of the teeth is configured to mate with a top surface of the studs for surface-to-surface engagement therebetween so that the clamping means exerts the clamping force on the compression driver to secure the membrane to the magnet structure.

6. The clamping structure of claim 5 wherein the studs are provided with a generally frusto-conical configuration to uniformly distribute the clamping force about a length and a width of the compression driver, the clamping force distributed uniformly about the compression driver to ensure that the membrane is securely clamped to the magnet structure.

7. The clamping structure of claim 6 wherein the studs of the compression driver and the teeth of the clamping means are provided with a generally tapered configuration to enhance the ease with which the compression driver and clamping means may be fabricated.

8. The clamping structure of claim 6 wherein the frusto-conical configuration of the studs enhances the ease of manufacture of the compression driver.

9. The clamping structure of claim 8 wherein the compression driver comprises a polymeric material and is formed with injection molding.

10. The clamping structure of claim 7 wherein the teeth are provided with tapered sides to provide ease of manufacture of the cover member.

11. The clamping structure of claim 10 wherein the cover member comprises a Mazak aluminum and zinc alloy and is fabricated with die casting, the tapered sides of the teeth enhancing the ease with which the cover is cast.

* * * * *